US009793046B2

(12) United States Patent
Rozman et al.

(10) Patent No.: US 9,793,046 B2
(45) Date of Patent: Oct. 17, 2017

(54) ROTATING TRANSFORMERS FOR ELECTRICAL MACHINES

(71) Applicant: Rosemount Aerospace Inc., Burnsville, MN (US)

(72) Inventors: Gregory I. Rozman, Rockford, IL (US); Jacek F. Gieras, Glastonbury, CT (US)

(73) Assignee: Rosemount Aerospace Inc., Burnsville, MN (US)

(*) Notice: Subject to any disclaimer, the term of this patent is extended or adjusted under 35 U.S.C. 154(b) by 227 days.

(21) Appl. No.: 14/184,281

(22) Filed: Feb. 19, 2014

(65) Prior Publication Data

US 2015/0115762 A1     Apr. 30, 2015

Related U.S. Application Data

(60) Provisional application No. 61/895,097, filed on Oct. 24, 2013.

(51) Int. Cl.
*H01F 38/18* (2006.01)
*H01F 41/00* (2006.01)
(Continued)

(52) U.S. Cl.
CPC ......... *H01F 38/18* (2013.01); *H01F 27/2804* (2013.01); *H01F 41/00* (2013.01);
(Continued)

(58) Field of Classification Search
CPC .......... H01F 38/18; H01F 41/02; H01F 41/04; H01F 41/06; H01F 41/00; H01F 5/00;
(Continued)

(56) References Cited

U.S. PATENT DOCUMENTS 3,202,948 A * 8/1965 Farrand .................... B23Q 5/36
336/115
3,614,593 A   10/1971 Lace
(Continued)

FOREIGN PATENT DOCUMENTS

DE   3724349 A1   2/1989
JP   H05101953 A  4/1993
(Continued)

OTHER PUBLICATIONS

Search Report and Opinion issued by the European Patent Office on Apr. 2, 2015 for European Patent Application No. 14189930.
(Continued)

*Primary Examiner* — Bernard Rojas
*Assistant Examiner* — Alexander Singh
(74) *Attorney, Agent, or Firm* — Locke Lord LLP; Scott D. Wofsy; Christopher J. Cillié

(57) ABSTRACT

A rotary transformer for an electrical machine includes a rotary printed circuit board and a stator printed circuit board. The rotary printed circuit board is operatively connected to the stator printed circuit board for relative rotation with respect to the stator printed circuit board. A conductor is fixed to the one of the printed circuit boards and includes a spiral coil for transferring electrical energy between the rotary printed circuit board and stator printed circuit board.

12 Claims, 6 Drawing Sheets

(51) Int. Cl.
| | |
|---|---|
| H01F 41/02 | (2006.01) |
| H01F 41/04 | (2006.01) |
| H01F 41/06 | (2016.01) |
| H02K 19/12 | (2006.01) |
| H02K 19/26 | (2006.01) |
| H01F 27/28 | (2006.01) |
| H02P 9/30 | (2006.01) |
| H02P 25/03 | (2016.01) |
| G01D 5/20 | (2006.01) |

(52) U.S. Cl.
CPC ............. *H01F 41/02* (2013.01); *H01F 41/04* (2013.01); *H01F 41/06* (2013.01); *H02K 19/12* (2013.01); *H02K 19/26* (2013.01); *H02P 9/302* (2013.01); *H02P 25/03* (2016.02); *G01D 5/2066* (2013.01)

(58) Field of Classification Search
CPC ..... H01F 38/00; H01F 27/2804; H02K 19/12; H02K 19/26; H02K 19/28; H02K 19/30; H02K 19/32; H02K 19/38; H02K 15/00; G01D 5/00; G01D 5/2066; H02P 25/026; H02P 9/302
USPC ............ 310/180, 176, 68 D, 40 R, 237, 268; 336/118, 123, 173
See application file for complete search history.

(56) References Cited

U.S. PATENT DOCUMENTS

| | | | | |
|---|---|---|---|---|
| 4,340,833 A | * | 7/1982 | Sudo | H02K 3/26 310/207 |
| 4,453,120 A | * | 6/1984 | Bauer | H02P 9/36 322/28 |
| 4,939,400 A | | 7/1990 | Matsushita et al. | |
| 5,229,696 A | * | 7/1993 | Golker | H02K 24/00 310/184 |
| 5,239,288 A | * | 8/1993 | Tsals | H02K 24/00 336/120 |
| 5,770,909 A | * | 6/1998 | Rosen | H02K 11/042 310/113 |
| 6,420,842 B1 | | 7/2002 | Gold | |
| 7,112,910 B2 | * | 9/2006 | Lopatinsky | H02K 1/2793 310/156.32 |
| 7,345,457 B2 | | 3/2008 | Garces et al. | |
| 8,073,335 B2 | * | 12/2011 | Labonville | A61B 19/2203 398/114 |
| 2002/0167384 A1 | * | 11/2002 | Paris | H01F 21/06 336/115 |
| 2009/0295523 A1 | | 12/2009 | Schwander et al. | |
| 2010/0117632 A1 | * | 5/2010 | Miyazaki | H02K 24/00 324/207.25 |

FOREIGN PATENT DOCUMENTS

| | | |
|---|---|---|
| WO | WO-2005031770 A1 | 4/2005 |
| WO | WO-2009101405 A2 | 8/2009 |

OTHER PUBLICATIONS

Daniel Kurschner, Christian Rathge, and Ulrich Jumar, "Design Methodology for High Efficiency Inductive Power Transfer Systems With High Coil Positioning Flexibility", *IEEE Trans. on Industrial Electronics*, vol. 60, No. 1, pp. 372-381, Jan. 2013.

* cited by examiner

ROTATING TRANSFORMERS FOR ELECTRICAL MACHINES

CROSS-REFERENCE TO RELATED APPLICATION

This application claims the benefit of priority to U.S. Provisional Patent Application No. 61/895,097 filed on Oct. 24, 2013 and is incorporated by reference herein in its entirety.

BACKGROUND OF THE INVENTION

1. Field of the Invention

The present disclosure relates to electrical machines, and more particularly to rotating transformers for wound field synchronous machines.

2. Description of Related Art

Electrical machines such as wound field synchronous generators and wound field synchronous motors include rotating and stationary parts. Typically, the rotating part includes field windings configured for rotation relative to armature windings arranged on the stationary part. In the case of wound field synchronous generators, a current flow through the field windings generates a magnetic field. As the rotating part rotates about the armature windings the magnetic field induces current flow in the armature windings, thereby converting mechanical rotation into electrical energy. In the case of wound field synchronous motors operation is reversed. Current flow to the armature windings generates a magnetic field. The magnetic field pushes a magnetic field excited into the field windings, thereby generating an electromagnetic torque that mechanically rotates the rotating part of the motor.

In both types of electrical machines, the rotating parts of the machine need communicate with the stationary part of the machine. The communication is typically in the form of electrical energy transferred from the stationary part to the rotating part of the machine, such as exciter current for main field windings. Typically, mechanical devices effect communication between the rotating and stationary parts of the electrical machine, such as through contacts, cables or slip rings. Alternatively, winding and armature sets can effect communication between the rotating and stationary parts of electrical machines.

Such conventional methods and systems have generally been considered satisfactory for their intended purpose. However, there is still a need in the art for apparatus and methods for providing communication between rotating and stationary parts of electrical machines. There is also a continuing need to transfer electrical energy between rotating and stationary parts of electrical machines that is efficient, suited for high frequency and/or power, and which is light weight and contactless. The present disclosure provides a solution for these problems.

SUMMARY OF THE INVENTION

A rotary transformer for an electrical machine includes a rotary printed circuit board (PCB) and a stator PCB. The rotary PCB is operatively connected to the rotary PCB for relative rotation with respect to the stator PCB circuit board. A conductor is fixed to the one of the PCBs and includes a spiral coil for transferring electrical energy between the rotary PCB and the stator PCB.

In certain embodiments, the coil can be planar. The coil can be a foil structure adhered to the PCB. The coil can be disposed on a PCB including an electrically insulating substrate. A ferromagnetic core can be connected to the substrate opposite the PCB. The isolating substrate and ferromagnetic core can also be disk-shaped.

In accordance with certain embodiments, the coil can be a first coil and the PCB can further include a second coil. The first and second coils can be radially offset from a rotation axis of the rotary transformer. The first and second coils can also be connected in series.

It is contemplated that the printed circuit board include any number of coils arranged about a circumference of the printed circuit board and configured to generate electromagnetic poles alternating polarities. The coil can be a single coil disposed on the printed circuit board extending about a rotation axis of the rotary transformer.

A wound field synchronous machine is also provided. The wound field synchronous machine has a rotary transformer as described above, a main field rotating power converter, and a control power module. The main field rotating power converter is connected to the rotary PCB of the rotary transformer. The control power module is connected to the stator PCB of the rotary transformer such that the control power module is electromagnetically connected by the rotary PCB and the stator PCB of the rotary transformer to the main field rotating power converter.

In certain embodiments, the rotary PCB of the rotary transformer can be connected to an internal power supply disposed a rotating part of the machine that is configured to provide current to main field windings of the machine. A demodulating module can be disposed on the rotating part of the wound field synchronous machine and connected to the rotary PCB for modulating current flow through the main field windings of the machine.

In accordance with certain embodiments, the rotary transformer can be a first rotary transformer and the machine can include a second rotary transformer connected to the control power module. A pulse width module can be connected to the stator PCB of the first rotary transformer for supplying power to the main field windings and a modulator/driver can be connected the stator PCB of the second rotary transformer for modulating current flowing through the main field windings.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
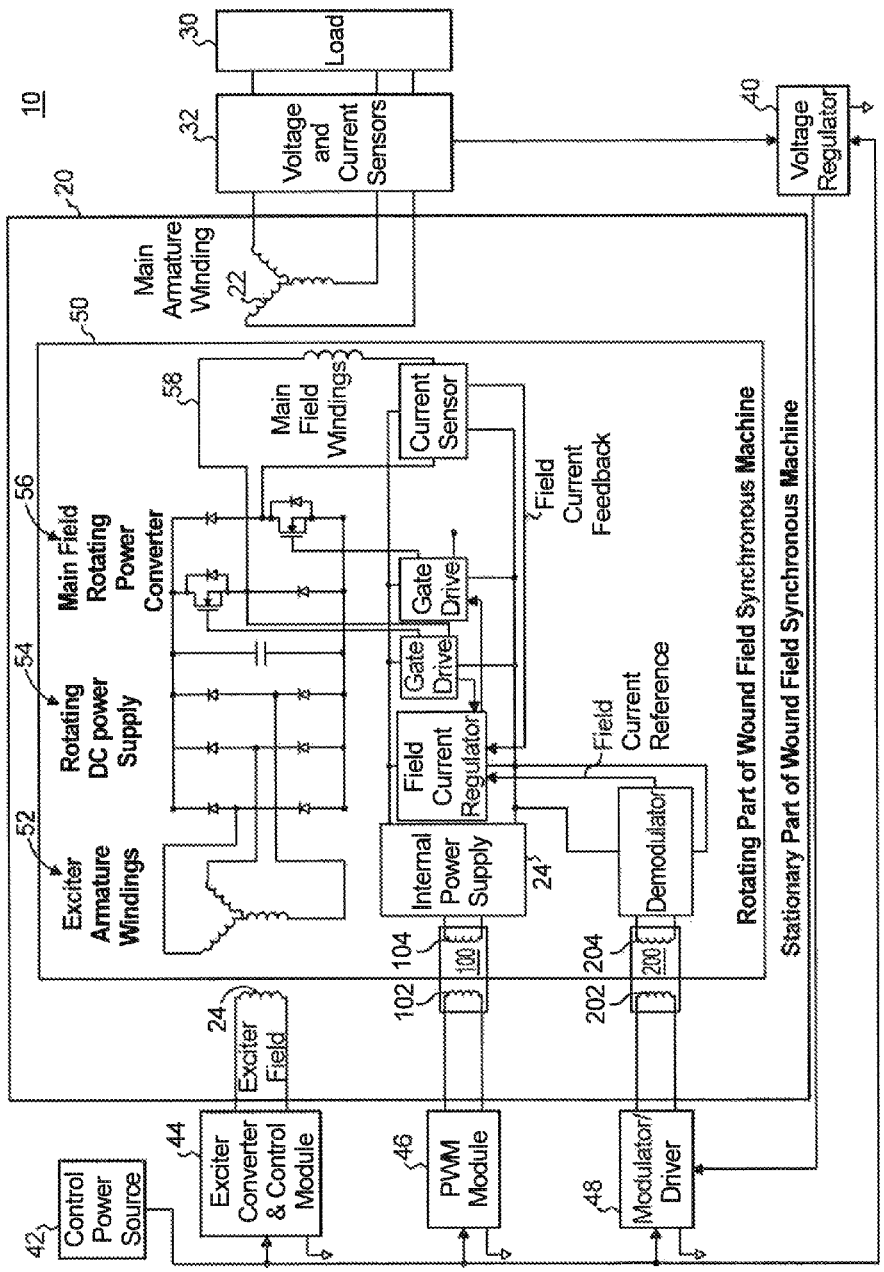
FIG. 1 is a schematic of an exemplary embodiment of a wound field synchronous generator constructed in accordance with the present disclosure, showing rotary transformers electromagnetically coupling stationary parts and rotating parts of the generator for transferring electrical energy therebetween.

Reference will now be made to the drawings wherein like reference numerals identify similar structural features or aspects of the subject disclosure. For purposes of explanation and illustration, and not limitation, a partial view of an exemplary embodiment of the rotary transformer in accordance with the disclosure is shown in FIG. 1 and is designated generally by reference character 100. Other embodiments of rotary transformers in accordance with the disclosure, or aspects thereof, are provided in FIGS. 2-4, as will be described. The systems and methods described herein can be used for electrical machines, such as wound field synchronous generators, motors, and generator/motors for example.

With reference to FIG. 1, an electrical machine 10 is shown. Electrical machine 10 is a wound field synchronous generator (WFSG), and includes a stationary part 20 and a rotating part 50. Rotating part 50 is operably coupled to stationary part 20 and configured such that rotating part 50 rotates with respect to stationary part 20.

Stationary part 20 includes main armature windings 22 and an exciter field coil 24. Stationary part 20 also includes a primary coil 102 of a first PCB rotary transformer 100 and a primary coil 202 of a second rotary transformer 200. An electrical load 30 and voltage and current sensor module 32 are electrically connected to main armature windings 22. Main armature windings 22 are configured such that a magnetic field generated by rotating part 50 induces current flow in main armature windings 22. This provides a current flow to electrical load 30 for powering electrical load 30. A voltage and current sensor module 32 is configured and adapted to monitor current and voltage generated within main armature windings 22 and provided to electrical load 30. Voltage and current sensor module 32 is electrically connected to a voltage regulator module 40, and provides information relating the sensed voltage and current thereto.

A control power source 42 is electrically connected to voltage regulator module 40. An exciter converter and control module 44 is electrically connected between control power source 42 and exciter field coil 24. Exciter converter control module 44 is configured and adapted to provide a current flow through exciter field coil 24.

Control power source 42 is also electrically connected to a pulse width modulation (PWM) module 46. PWM module 46 is electrically connected to a stator PCB 102 of a first rotary transformer 100. PWM module 46 is configured and adapted to provide a flow of current to rotary transformer 100 for transferring electrical energy from control power source 42 to rotating part 50 of WFSG 10 through stator PCB 102.

Control power source 42 and voltage regulator 40 are electrically connected to a modulator/driver module 48. Modulator/driver module 48 is electrically connected to a stator PCB 202 of second rotary transformer 200. Modulator/driver module 48 is configured and adapted to provide a flow of current to rotary transformer 200 for transferring electrical energy including voltage regulation information from control power source 42 and voltage regulator 40 to rotating part 50 of WFSG 10 through stator PCB 202.

With continued reference to FIG. 1, rotating part 50 of WFSG 10 includes exciter armature windings 52, a rotating direct current (DC) power supply 54, a main field rotating power converter 56, and main field windings 58. Exciter armature windings 52 are electromagnetically coupled with exciter field winding 24 such that current flow through exciter field winding 24 induces current flow within exciter armature windings 52. This induces an alternating current flow through exciter armature windings 52.

Exciter armature windings 52 are electrically connected to rotating DC power supply 54. Rotating DC power supply 54 includes a diode bridge. The diode bridge operates as a rotating rectifier, and converts the alternative current flow received from exciter armature windings 52 into a DC flow. DC power supply 54 supplies the DC flow to main field rotating power converter 58.

Main field rotating power converter 58 is electrically connected rotating DC power supply 54 and main field windings 58. Main field rotating power converter 58 is also electrically connected to PWM driver 46 through first rotating transformer 100 and modulator driver 48 through second rotating transformer 200. Main field rotating power converter 56 receives a DC flow from rotating DC power supply 54, power from PWM driver 46 (through an internal power supply and associated electrical components shown in FIG. 1), and a modulation signal from modulator/driver 48 (through a demodulator and associated electrical components shown in FIG. 1). Main field rotating power converter 56 is configured to convert these inputs into a controlled current flow through main field windings 58. The controlled current flow alters the magnetic field between main field windings 58 and main armature windings 22, thereby controlling power supplied to electrical load 30.

Generally, in electrical machines like WFSG 10, there is a need to transfer electrical energy from voltage regulator module 40 to the rotating main field current regulator module, labeled as the Field Current Regulator (FCR) in FIG. 1, through a contactless energy supply and without use of contacts, cables, or similar devices requiring physical contact between stationary and fixed components. First and second PCB rotary transformers 100 and 200 perform this function. For example, in the illustrated embodiment of WFSG 10 FCR module receives a current feedback signal from the current sensor connected to main field winding. It also receives a main field current reference signal from a demodulator module, labeled Demodulator in FIG. 1. The main field current reference signal (in analog form) is generated as an output from voltage regulator 40 in response to output of voltage and current sensors 32, and converted into a PWM signal in modulator driver module 48 for driving primary winding (coil) of rotary transformer 200. This modulated current reference signal is passed across the gap between primary and second coils 202 and 204 of rotary transformer 200. Secondary winding 204 is electrically connected to the demodulator module for reconstructing the main field current reference signal into an analog signal. This analog signal is then passed from the demodulator module to the FCR module. The FCR module in turn is electrically connected to the gate drives of the main field rotating power converter, and opens and closes the gates in accordance with the received signal.

Figure 2A:
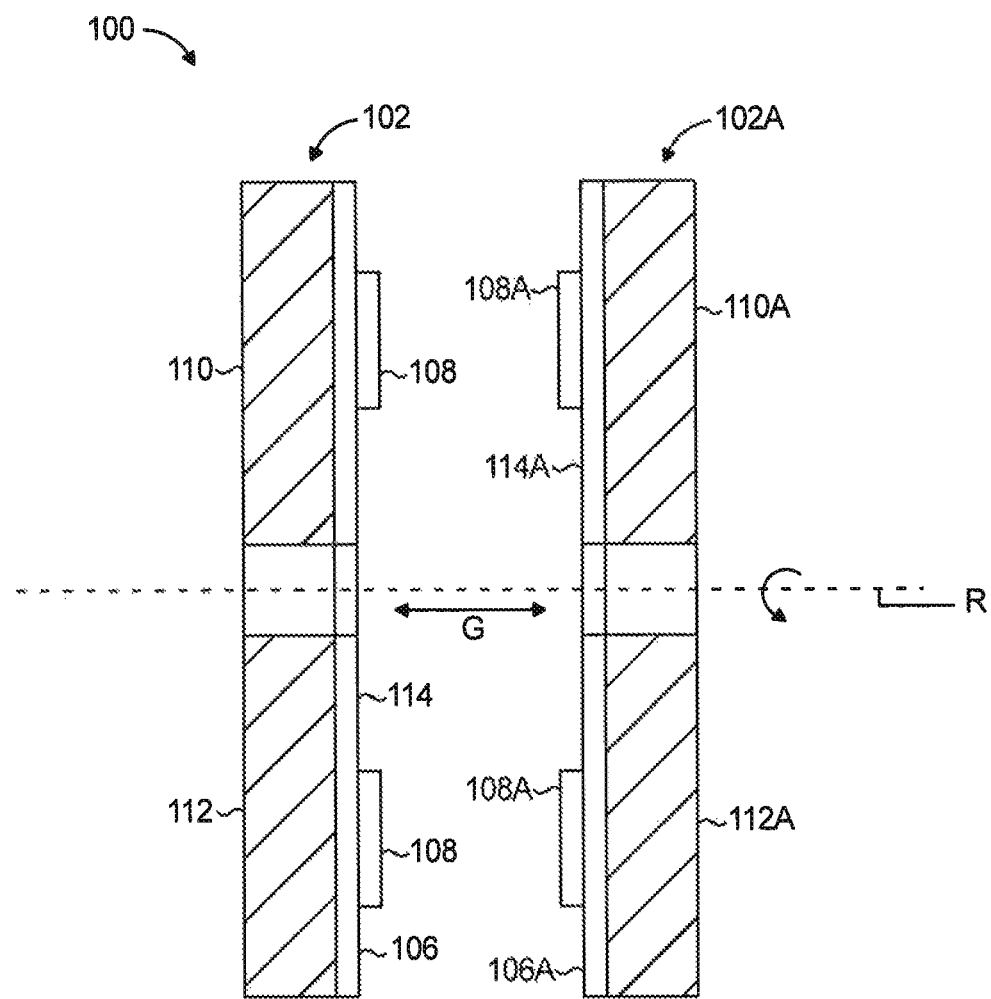
FIG. 2A is a cross-sectional side elevation view of an embodiment of a rotary transformer of FIG. 1, showing a rotary printed circuit board (PCB) and stator PCB of the rotary transformer.

With reference to FIG. 2A, rotary transformer 100 is shown. Rotary transformer 100 includes stator PCB 102 and a rotary PCB 102A. Rotary PCB 102A is operatively connected to stator PCB 102 for relative rotation with respect to stator PCB 102 about a rotation axis R, such as by stator PCB 102 being coupled to stationary part 20 of electrical machine 10 and rotary PCB 102A being connected to rotating part 50 of electrical machine 10. Stator PCB 102 and rotary PCB 102A are configured and adapted to electromagnetically couple one or both of PWM driver 46 to internal power supply 46A and modulator 48 to demodulator 48A, thereby transferring electrical energy between stationary part 20 and rotating part 50 of electrical machine 10. In the illustrated embodiment, transfer of electrical energy (AC current) is effected through a single spiral coil connected to each of stator PCB 102 and rotary PCB 102A.

Stator PCB 102 includes an isolating substrate 106, a coil 108, and a ferromagnetic core 110. Isolating substrate 106 has a core surface 112 and a coil surface 114, and is a PCB constructed from a dielectric material such as a polyimide substrate. Core 110 is connected to isolating substrate 106 at core surface 112, and is constructed from a material such as ferrite or any other ferromagnetic material. Coil 108 is attached, e.g. adhered, to coil surface 114 and is formed from a conductive material, such as by etching or being stamped from copper sheet for example. Coil 108 occupies a common plane, and in embodiments is a thin foil-like material.

Rotary PCB 102A is similar in construction to stator PCB 102, and includes an isolating substrate 106A, a coil 108A, and a ferromagnetic core 110A. Isolating substrate 106A has a core surface 112A and coil surface 114A, and is a PCB constructed from a dielectric material such as a polyimide substrate. Core 110A is connected to isolating substrate 106A on core surface 112A. Coil 108A is constructed from a conductive material formed from an etching process or can be stamped from a copper sheet for example, and is attached to coil surface 112A. Coil surface 114A and coil 108A of rotary PCB 102A are disposed opposite from coil surface 114 and coil 108 of stator PCB 102, and a gap G separating the coil surfaces 114 and 114A. Each of isolating substrate 106A and core 110A are disk-shaped, thereby providing balance to the rotary PCB 102A for vibration-free rotation.

Figure 2B:
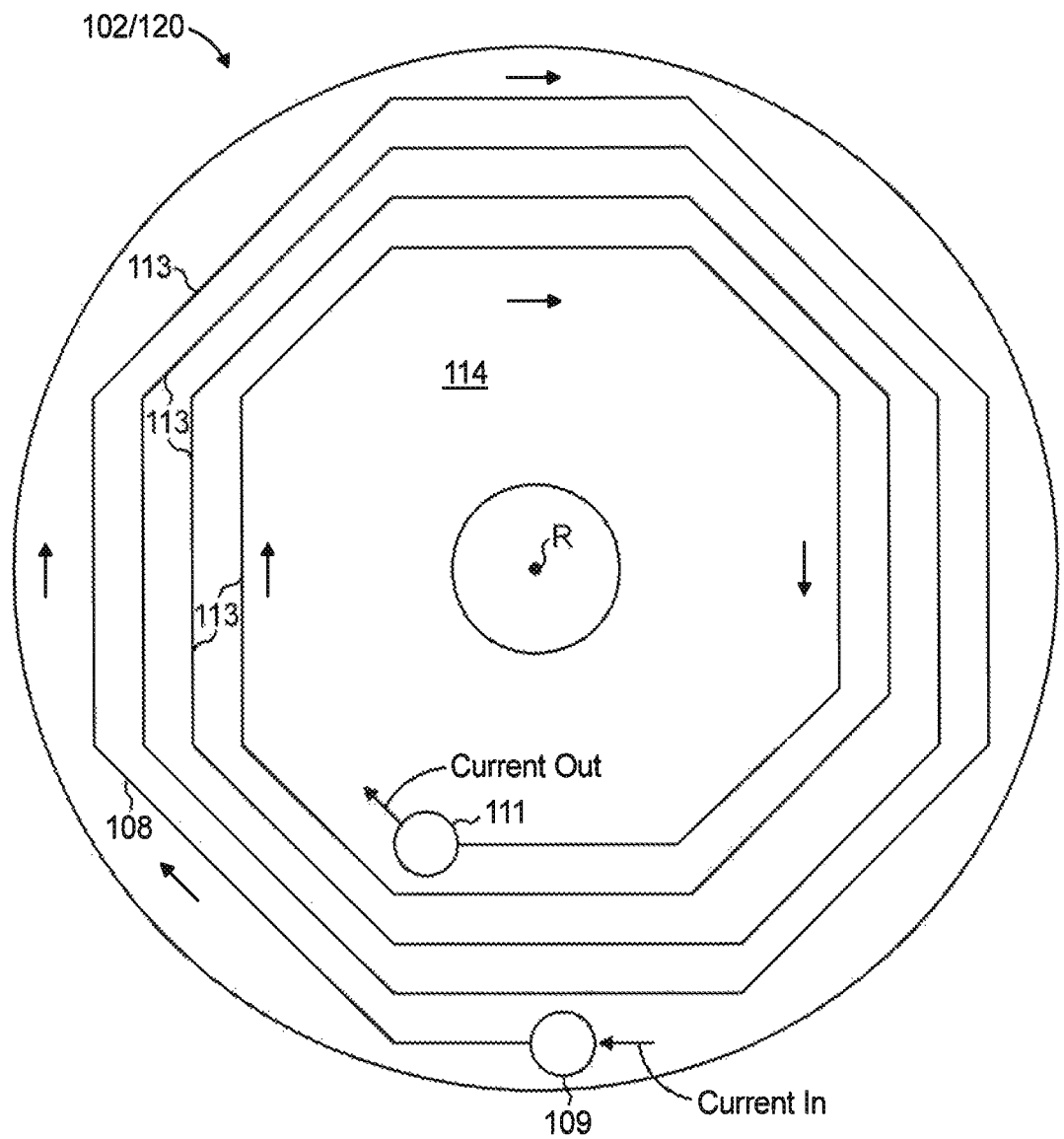
FIG. 2B is a plan view of the rotary transformer of FIG. 2A, showing the layout of the single spiral coil of the rotary PCB and stator PCB.

With reference to FIG. 2B, coil surface 114 is shown. Coil surface 114 has single coil 108 disposed thereon. Coil 108 has a radially outward current source 109 on an end, and is a radially inward current return 111. Coil 108 traces a single path extending between current source 109 and current return 111 such that current flows about the coil in a clockwise direction relative to rotation axis R. This causes the associated magnetic field to have a polarity. In the illustrated embodiment, coil 108 circumferentially traverses coil surface 114 in four loops 113. Coil 108 is supplied with alternating current. As will be appreciated by those skilled in the art, embodiments can include fewer or greater numbers of coil traverses as may be suitable for a given application of rotary transformer 100. As will also be appreciated, coil 108 can be arranged so that current flows in an opposite direction such that the associated field has an opposite pole.

While the foregoing discussion is limited to the construction of stator PCB 102, it will be appreciated that coil surface 114A of rotary PCB 102A is similarly constructed such that current flow within coil 106 of stator PCB 102 generates a magnetic field spanning gap G. The generated magnetic field induces a corresponding current flow in coil 106A of rotary PCB 102A, thereby transferring electrical energy across gap G using an electromagnetic coupling across gap G formed by stator PCB 102 and rotary PCB 102A.

Figure 3A:
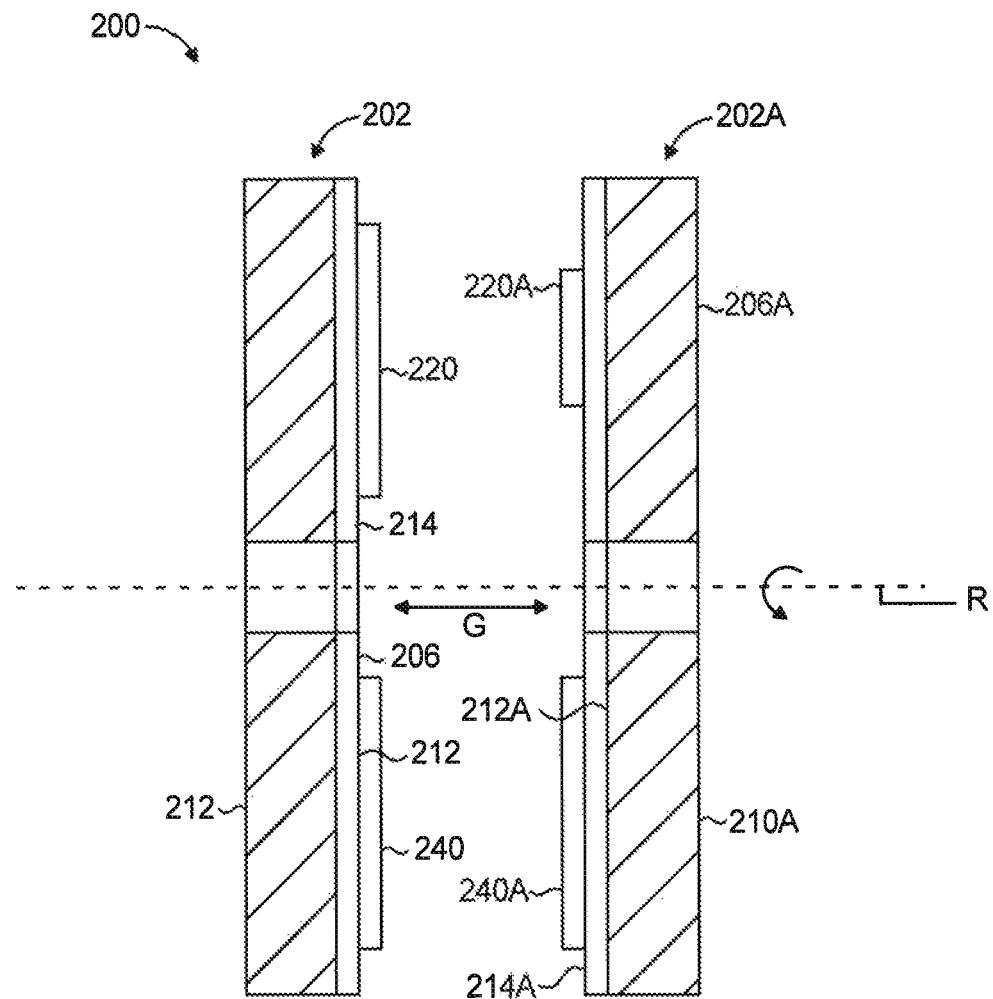
FIG. 3A is a cross-sectional side elevation view of another embodiment of a rotary transformer, showing a rotary PCB and a stator PCB or the rotary transformer.

With reference to FIG. 3A, a rotary transformer 200 is shown. Rotary transformer 200 is similar to rotary transformer 100, and includes stator PCB 202 and a rotary PCB 202A. Rotary PCB 202A is operatively connected to stator PCB 202 for relative rotation with respect to stator PCB 202 about a rotation axis R, such as by stator PCB 202 being coupled to stationary part 20 of electrical machine 10 and rotary PCB 202A being connected to rotating part 50 of electrical machine 10. Stator PCB 102 and rotary PCB 102A are configured and adapted to electromagnetically couple one or both of PWM driver 46 to internal power supply 46A and modulator 48 to demodulator 48A. This enables transfer of electrical energy between stationary part 20 and rotating part 50 of electrical machine 10 across one or both of PWM driver 46 and internal power supply 46A and modulator 48 and demodulator 48A. In the illustrated embodiment, transfer of electrical energy is effected through a plurality of spiral coils connected to each of stator PCB 202 and rotary PCB 202A.

Figure 3B:
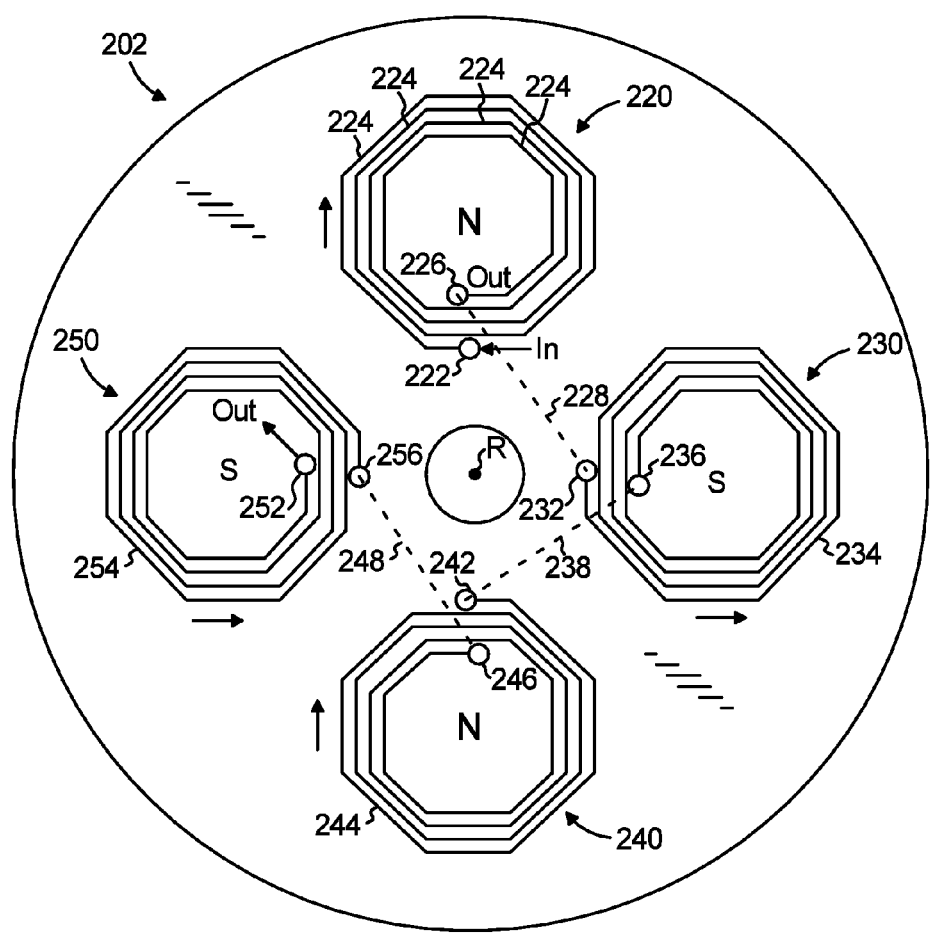
FIG. 3B is a plan view of the rotary transformer of FIG. 3A, showing the layout of the multiple coils of the rotary PCB and stator PCB.

Stator PCB 202 includes a core 210 connected to a core surface 212 of an isolating substrate 206, i.e. a PCB. With reference to FIG. 3B, stator PCB 202 includes a first coil 220, a second coil 230 (shown in FIG. 3B), a third coil 240, and a fourth coil 250 (shown in FIG. 3B) each disposed on a coil surface 214 of stator PCB 202. First, second, third, and fourth coils 220, 230, 230, and 250 are planar structures arranged substantially orthogonally with rotation axis R. The minimum number of coils in this illustrative example is two. As will be appreciated by those skilled in the art, the maximum number of coils depends on the construction of the transformer, application of the transformer, and the available space for coils on PCB 202.

Each of first coil 220, second coil 230, third coil 240, and fourth coil 250 are radially offset from rotation axis R by a common radial distance. Respective current sources and current returns of first, second, third, and fourth coils 220, 230, 240 and 250 are offset radially from rotation axis, the source and return of each coil being radially offset by different distances.

First coil 220 is electrically connected to a voltage source (shown in FIG. 1). Second coil 230 is electrically connected in series to first coil 220. Third coil 240 is electrically connected in series to second coil 230. Fourth coil 250 is electrically connected in series to third coil 240. With respect to the 12 o'clock position at the top of drawing sheet 5, current enters first coil 220 at a radially inward current source 222. The current traverses first coil 220 through four loops 224 in a clockwise direction, and thereafter exits through a current return 226 positioned radially outboard of current source 222.

Current return 226 is coupled by a bridge segment 228 (illustrated with a dotted line segment) to a current source 232 positioned radially inboard. Bridge segment 228 extends within isolating substrate 206 to electrically connect current return 226 and current source 232. Current entering source 232 traverses second coil 230 through four loops 234 (only one labeled for clarity purposes) in a counterclockwise direction. The current thereafter exits through a current return 236 positioned radially outboard of current source 232. Current return 236 is coupled by a bridge segment 238 (illustrated with a dotted line segment) to current source 242 positioned radially inboard with respect to current return 236. Bridge segment 238 extends within isolating substrate 206 and electrically connects current return 236 with current source 242.

Current entering current source 242 traverses third coil 240 through four loops 244 in a clockwise direction, thereafter exiting through a current return 246 positioned radially outboard of current source 242. Current return 246 is coupled by a bridge segment 248 (illustrated with a dotted line segment) to a current source 256 positioned radially inboard. Bridge segment 248 extends within isolating substrate 206 to electrically connect current return 246 and current source 252. Current entering source 256 traverses fourth coil 250 through four loops 254 (only one labeled for clarity purposes) in a counterclockwise direction. The current thereafter exits through a current return 252 positioned radially outboard of current source 232.

Current flowing through first coil 230, second coil 240, third coil 250, and fourth coil 260 generates a magnetic field. The magnetic field induces corresponding current flow in rotary PCB 202 rotatably arranged on an opposite side of gap G. Since current directional flow, e.g. clockwise or counterclockwise, determines polarity of the generated magnetic field, and current flows alternate successively through each of the coils about the circumference of coil surface 114, respective poles alternate. This is indicated in FIG. 3B with first coil 220 being identified with an N (North), second coil 230 begin identified with an S (South), etc. As will be appreciated, reversing current flow (such as by providing alternating current) causes the poles to switch polarities. This enables rotary transformer 200 to transfer electrical energy across gap G as a contactless electromagnetic coupling using either AC or DC power (due to rotation of the poles associated with the current flows). As will be appreciated, rotary transformer 200 can be constructed with two or more coils as suitable for a given application of rotary transformer 200. As will also be appreciated, each coil can have one or more loops as suitable for a given application.

While the following is above discussion is limited to the construction of stator PCB 202, it will be appreciated rotary PCB 202 is similarly constructed such that current flow through the illustrated coils of stator PCB 202 generates a magnetic field in gap G. The generated magnetic field induces a corresponding current flow in the coils of rotary PCB 202, thereby transferring electrical energy across gap G using an electromagnetic coupling across gap G formed by stator PCB 202 and rotary PCB 202A.

Figure 4A:
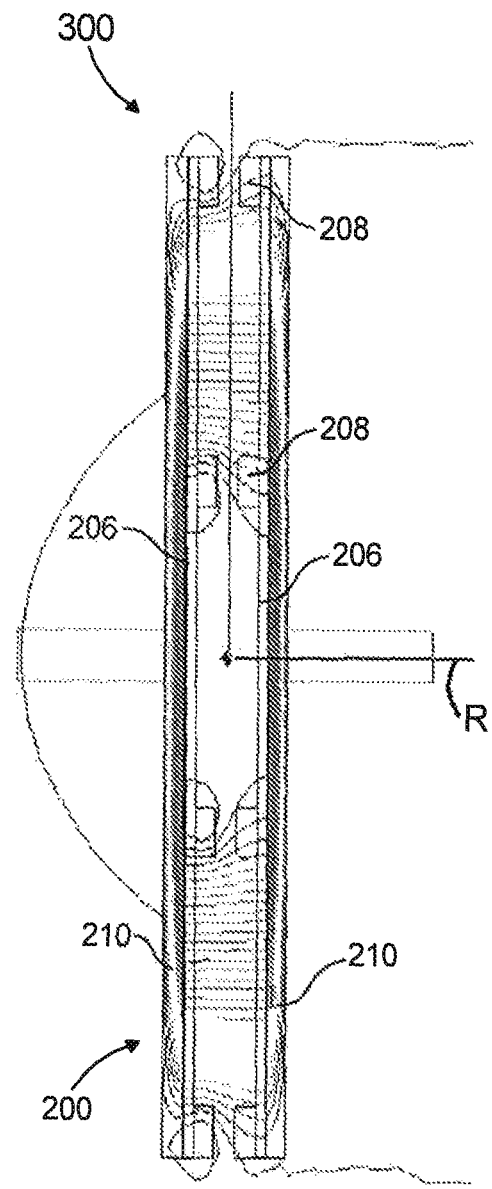
FIG. 4A is a magnetic flux distribution associated with the rotary transformer of FIGS. 3A and 3B, showing magnetic flux excited by multiple spiral coils one of the PCBs.
Figure 4B:
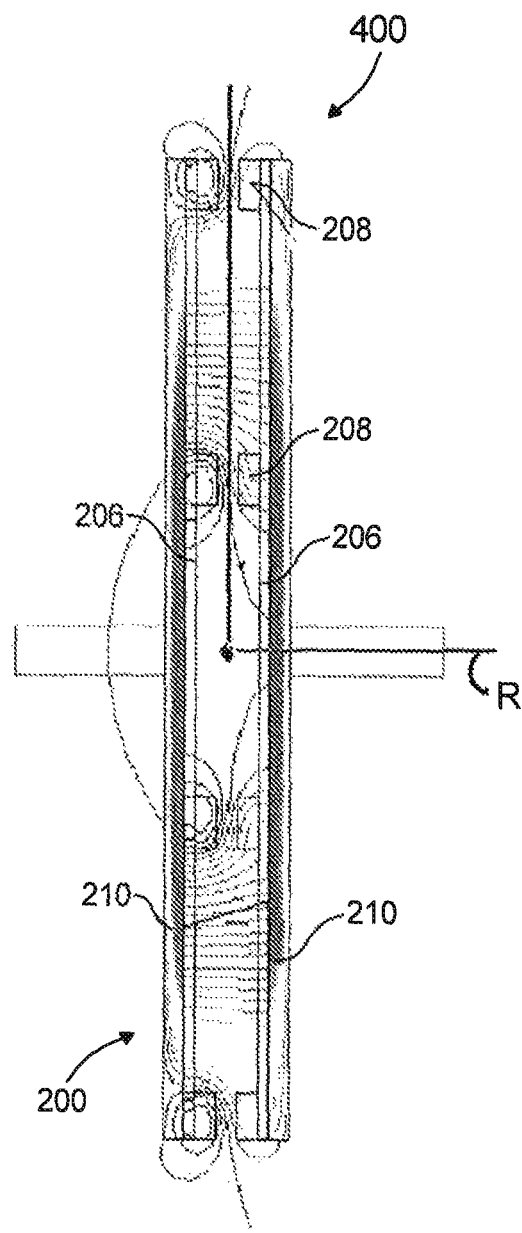
FIG. 4B is a magnetic flux distribution associated with the rotary transformer of FIGS. 3A and 3B, showing magnetic flux excited by multiple spiral coils of the rotary PCB and stator PCB.

With reference to FIG. 4A, an axial magnetic flux distribution 300 is shown. Magnetic flux distribution 300 is resultant from flowing current through stator PCB 202 of rotary transformer 200. The illustrated flux distribution 300 results from current flow through the primary (stator) coils only shown on the left hand side of the figure. With reference to FIG. 4B, a magnetic flux distribution 400 resultant from both stator PCB 202 and rotary PCB 202A of rotary transformer 200 is shown. The illustrated flux distribution 400 results from current flow through both primary (stator) coils and secondary (rotor) coils on the left and right sides of the figure. This magnetic flux distribution visualizes the operation of PCB transformer 200 under load.

Embodiments of rotatory transformers described herein provide improved electrical energy transfer by using ferrite or other ferromagnetic cores and high transmission frequencies. In the context of WFSG machines, rotary transformers provide independent control power to the rotating main field current regulator module, e.g. the FCR module. Embodiments of rotatory transformers described herein also enable transfer of control signals between stationary voltage regulators and rotating main field current regulators without mechanical contact through a rotary transformer. Embodiments of rotatory transformers described herein further reduce electrical machine volume and weight by replacing conventional rotary transformers with PCB rotary transformers.

Embodiments of rotary transformers described herein can supply control power from stationary components to control electronics located within rotating parts of wound field synchronous machines such as rotating part 50 of electrical machine 10 at high frequency. For example, embodiments powered by a PWM driver operating in the range of about 100 to about 400 Hertz can deliver more than a kilowatt of control power at more than 90% efficiency over an air gap to the rotating part of an electrical machine. It does so contactless, without the use of slip rings, cabling or other devices requiring physical contact between rotating and fixed components of the electrical machine.

Embodiments of rotary transformers described herein can also provide a communications link between stationary components, i.e. voltage regulator 40, and the rotating part of a wound field synchronous machine such as rotating part 50 of electrical machine 10. For example, embodiments of the rotary transformers described herein can provide a current reference signal in the transferred electrical energy to the main field current regulator. The communications link can also be bi-directional, thereby allowing sensors located on the rotating part of the electrical machine to communicate information such as main field current and voltage of the main field or device temperatures to a stationary voltage regulator.

The methods and systems of the present disclosure, as described above and shown in the drawings, provide for wound field synchronous machines with superior properties including contactless transfer of energy between the rotating and stationary parts of the machine for providing current and current modulation to the main field windings of the machine. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:
1. A wound field synchronous machine, comprising:
a rotating transformer, comprising:
a stator printed circuit board (PCB) arranged along a rotation axis;
a rotary PCB axially separated from the stator PCB by a gap and supported for relative rotation about the rotation axis relative to the stator PCB, a coil surface of the rotary PCB axially opposing a coil surface of the stator PCB across the gap;
a ferromagnetic core connected to a core surface of the stator PCB on a side of the stator PCB axially opposite the coil surface;
a ferromagnetic core connected to a core surface of the rotary PCB on a side of the rotary PCB axially opposite the coil surface; and
conductors fixed to the coil surfaces of the stator PCB and the rotor PCB, each conductor including, first and second spiral coils configured to transfer electrical energy between the stator PCB and the rotary PCB, the second spiral coil circumferentially offset from the first spiral coil about the rotation axis;

a bridge segment extending through the PCB electrically connecting the second spiral coil with the first spiral coil, wherein the first and second spiral coils are arranged on only one side of the respective PCB such that the first and second spiral coils of rotary PCB conductor and the first and second spiral coils of the stator PCB conductor are wholly disposed within the gap;

a main field rotating power converter connected to the rotary PCB of the rotating transformer;

a control power module connected to the stator PCB of the rotating transformer, wherein the control power module is electromagnetically connected by the stator PCB and the rotary PCB of the rotating transformer to the main field rotating power converter.

2. The rotating transformer as recited in claim 1, wherein the conductor includes foil adhered to the coil surface of the PCB.

3. The rotating transformer as recited in claim 1, wherein the spiral coil traces a polygonal path over the coil surface of the PCB through an etched copper sheet conductive structure.

4. The rotating transformer as recited in claim 3, wherein the PCB includes an insulating substrate connecting the ferromagnetic core to the first and second spiral coils, the insulating substrate axially separating the first and second spiral coils from the ferromagnetic core.

5. The rotating transformer as recited in claim 4, wherein the isolating substrate and the ferromagnetic core are disk-shaped.

6. The rotating transformer as recited in claim 1, wherein the first and second spiral coils are electrically connected in series.

7. The rotating transformer as recited in claim 1, wherein the conductor includes three or more spiral coils electrically connected in series and respectively configured to form alternating poles about a circumference of the PCB.

8. The wound field synchronous machine as recited in claim 1, wherein the rotary PCB is connected to an internal power supply disposed on a rotating part of the machine and configured to provide current to main field windings of the wound field synchronous machine.

9. The wound field synchronous machine as recited in claim 1, wherein the rotary PCB is connected to a demodulating module disposed on a rotating part of the wound field synchronous machine and configured for modulating current flow through main field windings of the wound field synchronous machine.

10. The wound field synchronous machine as recited in claim 1, wherein the rotating transformer is a first rotating transformer and further including a second rotating transformer connected to the control power module.

11. The wound field synchronous machine as recited in claim 10, further including:

a pulse width module connected to the stator PCB of the first rotating transformer and configured for supplying power to the main field windings; and a modulator/driver connected to the stator PCB of the second rotating transformer and configured for modulating current flowing through the main field windings.

12. A wound field synchronous machine, comprising:

a rotating transformer, comprising:

a stator printed circuit board (PCB) with a coil surface and a core surface arranged along a rotation axis and axially separated by an insulating substrate;

a ferromagnetic core connected to the core surface of the stator PCB on a side of the stator PCB axially opposite the coil surface;

a single stator coil comprising a foil body adhered to the coil surface of the stator PCB, the stator coil extending about the rotation axis arranged axially on only one side of the stator PCB;

a rotary PCB axially separated from the stator PCB by a gap and supported for relative rotation about the rotation axis relative to the stator PCB, a coil surface of the rotary PCB axially opposing a coil surface of the stator PCB across the gap;

a ferromagnetic core connected to a core surface of the rotary PCB on a side of the rotary PCB axially opposite the coil surface; and a single rotary coil comprising a foil body adhered to the coil surface of the rotary PCB, the rotary coil extending about the rotation axis arranged axially on only one side of the rotary PCB within the gap such that only the single stator coil and the single rotary coil are disposed within the gap, the rotary coil and the stator coil being wholly disposed within the gap a main field rotating power converter connected to the rotary PCB of the rotating transformer;

A control power module connected to the stator PCB of the rotating transformer, wherein the control power module is electromagnetically connected by the stator PCB and the rotary PCB of the rotating transformer to the main field rotating power converter.

* * * * *